(12) United States Patent
Lok et al.

(10) Patent No.: US 8,544,527 B2
(45) Date of Patent: Oct. 1, 2013

(54) METHOD TO REDUCE CONDENSATION IN A COOLING ZONE OF A CONTINUOUS CATALYST REGENERATION SYSTEM

(75) Inventors: Ka Lok, Buffalo Grove, IL (US); Christopher Naunheimer, Arlington Heights, IL (US); Matthew Zuraski, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 1091 days.

(21) Appl. No.: 12/342,790

(22) Filed: Dec. 23, 2008

(65) Prior Publication Data

US 2010/0155020 A1 Jun. 24, 2010

(51) Int. Cl.
*F23L 15/02* (2006.01)
*F28D 17/00* (2006.01)
*C10G 35/04* (2006.01)
*B01J 20/34* (2006.01)

(52) U.S. Cl.
USPC .................. 165/4; 202/123; 208/134; 502/20; 502/35

(58) Field of Classification Search
USPC .............. 165/4; 34/394; 202/123; 208/134; 208/173; 422/145, 223; 502/20, 35
See application file for complete search history.

(56) References Cited

U.S. PATENT DOCUMENTS

| | | | |
|---|---|---|---|
| 3,656,295 A | | 4/1972 | Fokker |
| 4,687,637 A * | | 8/1987 | Greenwood ............... 422/62 |
| 4,701,429 A * | | 10/1987 | Greenwood ............... 422/223 |
| 5,824,619 A * | | 10/1998 | Sechrist et al. ............... 34/394 |
| 6,121,180 A * | | 9/2000 | Gevelinger ................ 502/35 |
| 6,123,833 A * | | 9/2000 | Sechrist et al. ............ 208/134 |
| 6,290,916 B1 * | | 9/2001 | Sechrist et al. ............ 422/145 |
| 6,318,066 B1 | | 11/2001 | Skowronski |
| 7,745,364 B2 * | | 6/2010 | Fecteau et al. .............. 502/20 |
| 7,803,326 B2 * | | 9/2010 | Fecteau et al. ............. 422/145 |
| 7,811,447 B2 * | | 10/2010 | Fecteau et al. ............. 208/173 |
| 8,071,497 B2 * | | 12/2011 | Yuan et al. ................. 502/35 |
| 8,431,081 B2 * | | 4/2013 | Demirel et al. ............ 422/145 |

FOREIGN PATENT DOCUMENTS

| | | |
|---|---|---|
| EP | 0 063 195 B1 | 3/1990 |
| GB | 717782 A | 11/1954 |
| GB | 745354 A | 2/1956 |
| GB | 770242 A | 3/1957 |
| GB | 979192 A | 1/1965 |
| WO | 2006/008329 A1 | 1/2006 |

OTHER PUBLICATIONS

Hawkins, D., "Efficiency Improvement Systems for Fossil Fired Power Stations," *Power Generation Industries—Power-Gen*, 1997, p. 176 (abstract only).

(Continued)

*Primary Examiner* — Ljiljana Ciric
(74) *Attorney, Agent, or Firm* — Maryann Maas

(57) ABSTRACT

A process for providing a blended cooling air stream to a cooling zone cooler in a continuous catalyst regeneration system. The process includes removing a first effluent stream from a regeneration tower, providing the first effluent stream to a regeneration cooler; providing a first air stream to the regeneration cooler to form a heated first air stream, combining at least a portion of the heated first air stream with a second air stream to form a blended cooling air stream, and providing the blended cooling air stream to a cooling zone cooler.

11 Claims, 4 Drawing Sheets

(56) References Cited

OTHER PUBLICATIONS

Tipton, J.A. et al., "Energy Economizer for Low Temperature Stack Gas EM Dash a Case Study," *Institution of Chemical Engineers*, Symposium Series, 1978, p. 21 (abstract only).

Vikhman, A.G. et al., "Selecting an Air Heater. Technical and Economic Rationale," *Chemistry and Technology of Fuels and Oils*, Jul. 2006, vol. 42, No. 4, pp. 262-270 (abstract only).

Pfenninger, H., "Gas Turbine with waste heat utilization by Air Preheating," *Engineers' Digest* (British Edition), Dec. 1943, vol. 4, No. 12, pp. 352-353 (abstract only).

Bridgers, F.H., "Efficiency Study: Preheating Outdoor Air for Industrial and Institutional Applications," ASHRAE Journal, Feb. 1980, vol. 22, No. 2, pp. 29-31 (abstract only).

* cited by examiner

2

METHOD TO REDUCE CONDENSATION IN A COOLING ZONE OF A CONTINUOUS CATALYST REGENERATION SYSTEM

FIELD OF THE INVENTION

The systems and processes disclosed herein relate to the regeneration of spent catalyst in the art of catalytic conversion of hydrocarbons to useful hydrocarbon products, and more particularly to reducing or eliminating condensation in a cooling zone cooler utilized in a continuous catalyst regeneration (CCR) process.

DESCRIPTION OF RELATED ART

The catalysts used in catalytic processes for the conversion of hydrocarbons tend to become deactivated for one or more reasons. In instances where the accumulation of coke deposits causes the deactivation, regenerating of the catalyst to remove coke deposits can restore the activity of the catalyst. Coke is normally removed from catalyst by contact of the coke-containing catalyst at high temperature with an oxygen-containing gas to combust and remove the coke in a regeneration process. These processes can be carried out in-situ, or the catalyst may be removed from a reactor in which the hydrocarbon conversion takes place and transported to a separate regeneration zone for coke removal. Various arrangements for continuously or semicontinuously removing catalyst particles from a reaction zone and for coke removal in a regeneration zone have been developed.

SUMMARY OF THE INVENTION

The systems and processes disclosed herein relate to continuous catalyst regeneration, particularly to such systems and processes that utilize a cooling zone cooler.

In one aspect, a method of providing a blended cooling air stream to a cooling zone cooler in a continuous catalyst regeneration system is provided that includes removing a first effluent stream from a regeneration tower, providing the first effluent stream to a regeneration cooler; providing a first air stream to the regeneration cooler to form a heated first air stream, combining at least a portion of the heated first air stream with a second air stream to form a blended cooling air stream, and providing the blended cooling air stream to a cooling zone cooler. The method can also include removing a first gas stream from a regeneration tower, passing the first gas stream to an air heater to form a heated first gas stream, dividing the heated first gas stream to form a regeneration tower return stream and a cooling loop stream, providing the cooling loop stream to the cooling zone cooler, and cooling the cooling loop stream with the blended cooling air stream.

In another aspect, a system for continuous catalyst regeneration is provided that includes a regeneration tower, a regeneration cooler that receives a first effluent stream that is removed from the regeneration tower, a cooler blower that provides a first air stream that is passed to the regeneration cooler to form a heated first air stream and a second air stream that is combined with the heated first air stream to form a blended cooling air stream, and a cooling zone cooler that receives the blended cooling air stream.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
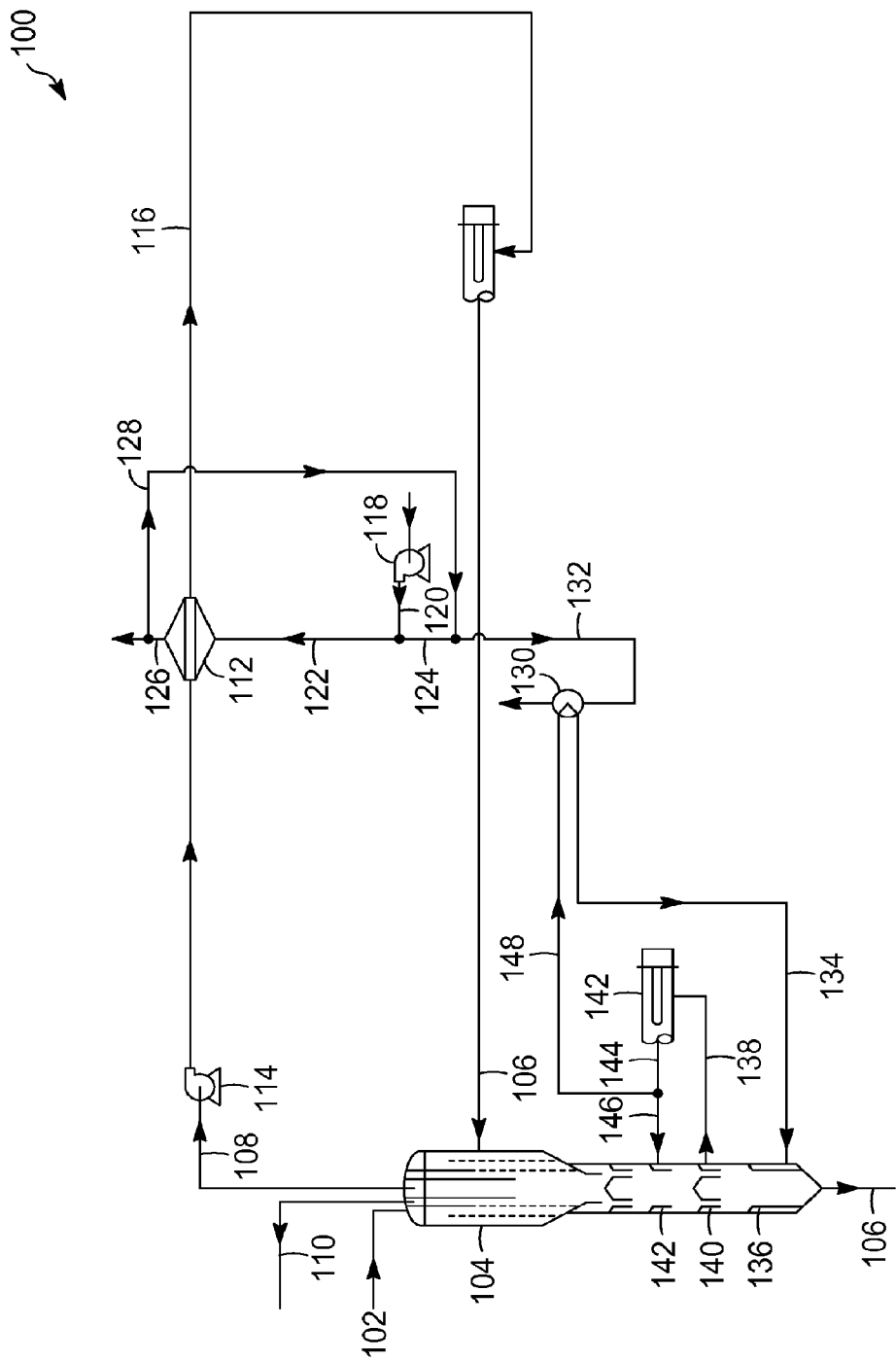
FIGS. 1 and 1A are simplified flow diagrams of embodiments of a continuous catalyst regeneration process.

FIG. 1 is a simplified flow diagram of a continuous catalyst regeneration (CCR) system indicated generally at 100. As illustrated, spent catalyst 102 is removed from a reactor and is provided to a catalyst regeneration tower 104. The catalyst regeneration tower can have a plurality of regeneration zones or stages through which the spent catalyst passes when undergoing regeneration. Regenerated catalyst 106 is removed from the catalyst regeneration tower, and can be returned to the reactor.

As illustrated in FIG. 1, a first effluent stream 108 and a second effluent stream 110 are removed from the top of the regeneration tower 104. First effluent stream 108 is a gaseous stream that primarily contains nitrogen, but can also contain oxygen and byproducts of combustion including, but not limited to, carbon dioxide. In one example, first effluent stream 108 can contain up to about 80% nitrogen and up to about 2% oxygen. First effluent stream 108 can also include byproducts of combustion, including, but not limited to, carbon dioxide. The second effluent stream 110 is a gaseous stream that primarily contains nitrogen, but can also contain oxygen and byproducts of combustion including, but not limited to, carbon dioxide. The first and second effluent streams can each have a temperature of from about 890° F. (477° C.) to about 1100° F. (593° C.).

Figure 1A:
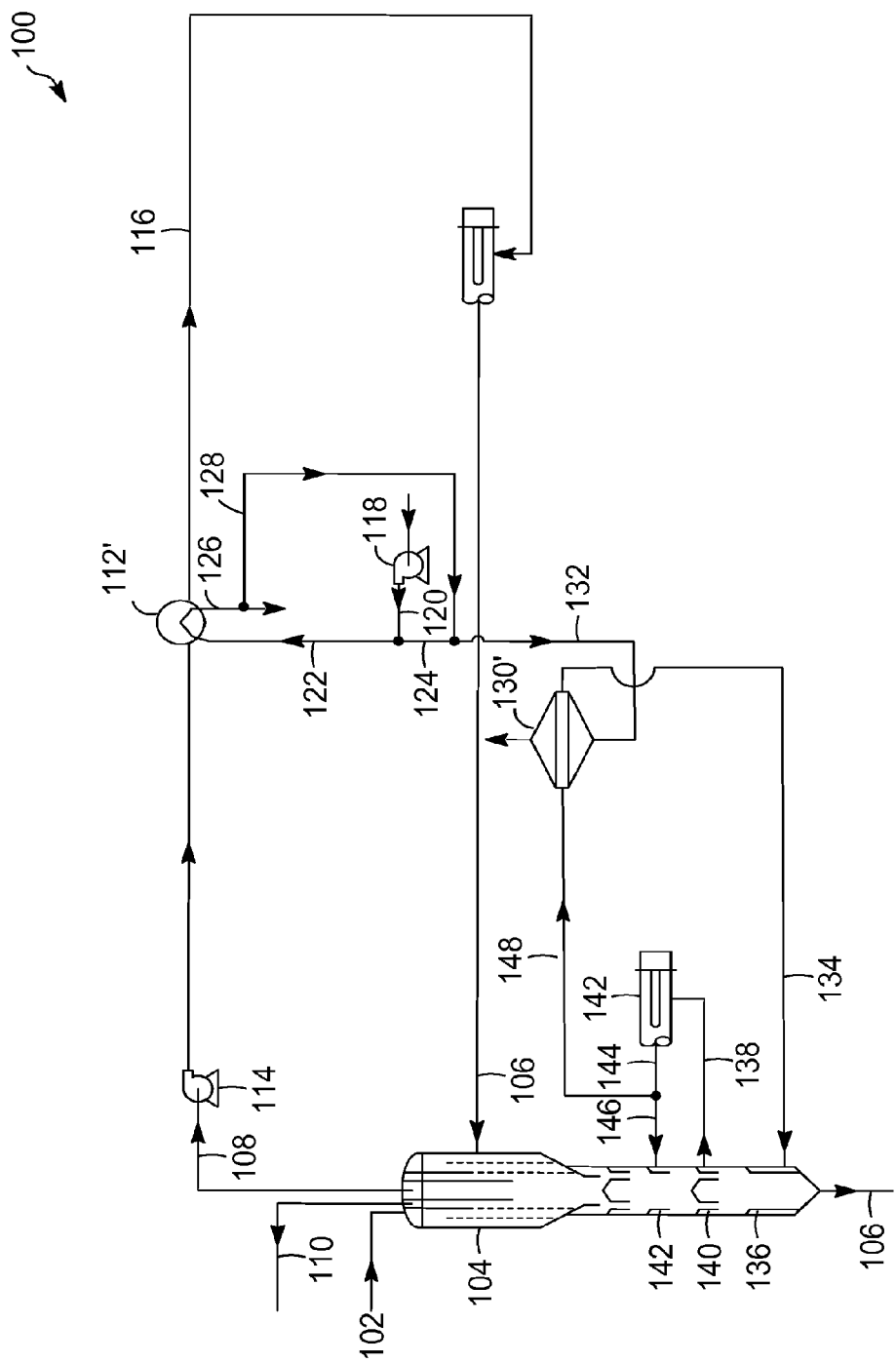

The first effluent stream 108 is illustrated as being part of a regeneration gas loop intended to remove heat of combustion produced during catalyst regeneration in regeneration tower 104. The first effluent stream 108 is passed through a conduit to a regeneration cooler 112. Regeneration cooler 112 is a device utilized to remove heat from first effluent stream 108 that is generated as the heat of combustion of the spent catalyst in the regeneration tower 104. A regeneration blower 114 can be utilized to facilitate the flow of the first effluent stream 108 from the regeneration tower 104 to the regeneration cooler 112. The regeneration cooler is a heat exchanger, and is preferably an indirect heat exchanger having a hot side and a cold side as shown in FIG. 1A as regeneration cooler 112'. FIG. 1 shows a specific embodiment where regeneration cooler 112 is a tube in shell type heat exchanger having one or more tubes. When regeneration cooler 112 is a tube in shell heat exchanger, the first effluent stream 108 can be passed through the one or more tubes of the heat exchanger to form a cooled effluent stream 116. Cooled effluent stream can have a temperature of from about 700° F. (371° C.) to about 1000° F. (538° C.). Cooled effluent stream 116 can then undergo other processing, in some examples can be passed back to one of the regeneration zones of the regeneration tower 104.

The CCR system illustrated in FIG. 1 includes a cooler blower 118. Cooler blower 118 receives atmospheric air, or ambient air from the outdoors, and provides an atmospheric air stream 120 to the CCR system. The atmospheric air initially has a temperature equivalent to the outdoor temperature, which can range between winter temperatures of down to about −10° F. (−23° C.) or below and summer temperatures of up to about 100° F. (38° C.) or above, depending upon the location of the facility in which the CCR process is being used.

Atmospheric air stream 120 can be divided into at least two air streams, including a first air stream 122 and a second air stream 124. First air stream 122 is provided to the regeneration cooler 112. When the regeneration cooler 112 is a tube in shell type heat exchanger, the first air stream 122 can be passed through the shell of the heat exchanger to act as a cooling stream for the first effluent stream 108. As first air stream 122 passes through the regeneration cooler 112, it absorbs heat from the first the first effluent stream 108, and it exits the regeneration cooler 112 as heated first air stream 126. At least a portion of heated first air stream 126 can be separated and directed back into the CCR system as hot air stream 128. Any remaining portion of heated first air stream 126 can be vented to the atmosphere. As described in further detail below, hot air stream 128 is preferably combined with the second air stream 124 to form a blended cooling air stream 132. In this manner, the heat of combustion of the spent catalyst that is removed from the first effluent stream 108 in the regeneration cooler 112 can be utilized as a heat source to adjust the temperature of the blended cooling air stream 132.

As shown in FIG. 1, blended cooling air stream 132 is passed through a conduit to cooling zone cooler 130. Cooling zone cooler 130 is utilized in the CCR system to provide a catalyst cooling stream 134 to a catalyst cooling zone 136 of the regeneration tower 104. The catalyst cooling stream 134 is generated by a cooling gas loop in the CCR system.

As illustrated in FIG. 1, the cooling gas loop includes a first gas stream 138 that is removed from the cooling zone outlet 140 of the regeneration tower 104. First gas stream 138 contains air, and can include, for example, nitrogen, water, hydrochloride, chlorine and combustion products. The temperature of first gas stream 138 can vary, depending upon the operating conditions of the regeneration tower 104. For example, first gas stream 138 can have a temperature of from about 200° F. (93° C.) to about 1000° F. (538° C.). First gas stream 138 is passed through a conduit to an air heater 142. Air heater 142 heats the first gas stream, for example to a temperature of about 1050° F. (566° C.), to form a heated first gas stream 144. The heated first gas stream 144 can be divided into at least two gas streams, including a regeneration tower return stream 146 and a cooling loop stream 148. The regeneration tower return stream 146 is passed through a conduit back to the regeneration tower 104, and is provided to the drying zone 142 of the regeneration tower 104. The cooling loop stream 148 is passed through a conduit to the cooling zone cooler 130.

Cooling zone cooler 130 is a heat exchanger, and is preferably an indirect heat exchanger having a hot side and a cold side. In a specific embodiment as shown in FIG. 1A, for example, cooling zone cooler 130' can be a tube in shell type heat exchanger having one or more tubes that act as the hot side of the heat exchanger. The cooling loop stream 148 can be passed through the hot side of the cooling zone cooler 130 to form catalyst cooling stream 134. Blended cooling air stream 132 can be passed through the cold side of the cooling zone cooler, which is the shell when cooling zone cooler 130 is a tube in shell type hat exchanger, to act as a cooling stream for catalyst cooling stream 134.

The temperature of blended air stream 132 is preferably greater than the dewpoint temperature of cooling loop stream 148. If the blended air stream has a temperature lower than the dewpoint temperature of the cooling loop stream 148, at least a portion of the cooling loop stream 148 can condense as it passes through the cooling zone cooler 130. Over time, condensation of the cooling loop stream 148 within the cooling zone cooler can cause corrosion. Without being bound by any particular theory, it is believed that maintaining the cooling loop stream in a gaseous state, and avoiding condensation thereof, will reduce or prevent corrosion within the cooling loop cooler. The dewpoint of the cooling loop stream 148 will vary depending upon its pressure. In some instances, the cooling loop stream can have a pressure of about 35 psig. In such instances, the blended cooling air stream 132 can have a temperature of about 40° F. (4° C.) or greater. For example, blended cooling air stream 132 can preferably have a temperature of from about 40° F. (4° C.) to about 160° F. (71° C.), more preferably about 120° F. (49° C.). As the temperature of the blended cooling air stream 132 increases, the efficiency of the heat exchange within the cooling zone cooler can be affected. Generally, as the differential between the temperature of the blended cooling air stream 132 and the cooling loop stream 148 decreases, the efficiency of the cooling zone cooler 130 for a given volume decreases.

As it exits the cooling zone cooler 130, the catalyst cooling stream 134 is in a gaseous state. The catalyst cooling stream 134 preferably has a temperature of from about 100° F. (38° C.) to about 300° F. (149° C.), more preferably about 160° F. (71° C.). If the temperature of the catalyst cooling stream 134 is too high, its efficiency in the cooling zone inlet 136 of the regeneration tower is decreased. If the temperature of the catalyst cooling stream 134 is too low, condensation can occur within the catalyst cooling stream 134. Condensation can cause corrosion within the conduits of the process system.

Figure 2:
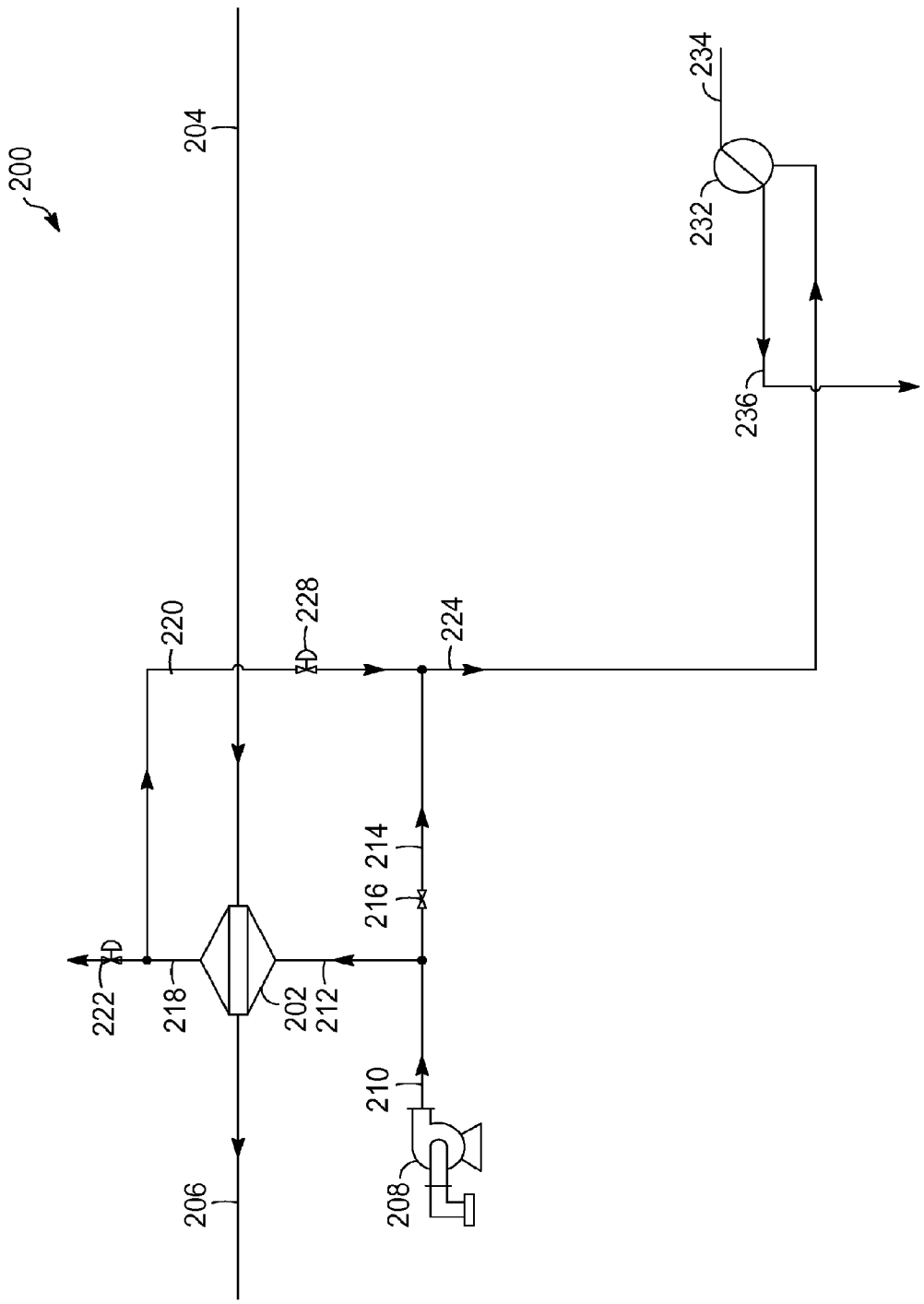
FIGS. 2 and 2A are simplified flow diagrams of the air loop of the continuous catalyst regeneration process of FIGS. 1 and 1A.
Figure 2A:
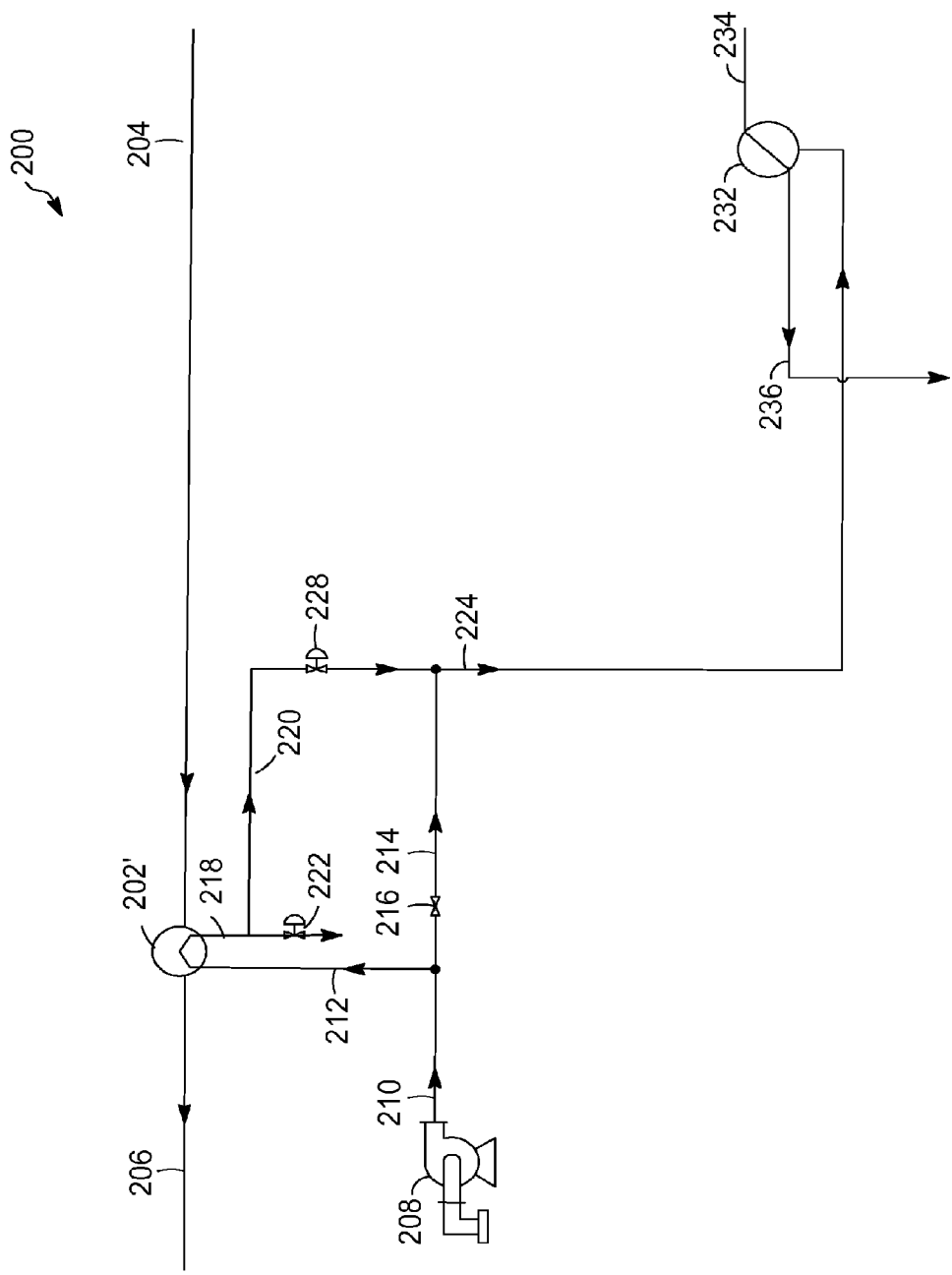

FIG. 2 is a simplified flow diagram of one example of an air loop 200 of a continuous catalyst regeneration process, such as the process illustrated in FIG. 1. As shown, regeneration cooler 202 receives a first effluent stream 204 that has been removed from a regeneration tower (not shown). First effluent stream 204 is a gaseous stream that primarily contains nitrogen, but can also contain oxygen and products of combustion, and can have a temperature of from about 700° F. (371° C.) to about 1100° F. (593° C.). In one example, first effluent stream 204 can contain primarily nitrogen, and can contain a small percentage of oxygen. For example, first effluent stream 204 can contain up to about 80% nitrogen and up to about 2% oxygen. The first effluent stream 204 is passed through a conduit to the regeneration cooler 202. The regeneration cooler is a heat exchanger, and is preferably an indirect heat exchanger having a hot side and a cold side as shown in FIG. 2A as regeneration cooler 202'. In a specific embodiment, the regeneration cooler can be, for example, a tube in shell type heat exchanger having one or more tubes as shown in FIG. 2 as regeneration cooler 202. When regeneration cooler 202 is a tube in shell heat exchanger, the first effluent stream 204 can be passed through the one or more tubes of the heat exchanger to form a cooled effluent stream 206. Cooled effluent stream can have a temperature of from about 700° F. (371° C.) to about 1000° F. (538° C.), but this temperature can vary depending upon the operating conditions of the regeneration tower. Cooled effluent stream 206 can then undergo other processing, in some examples can be passed back to one of the regeneration zones of the regeneration tower.

The air loop 200 illustrated in FIG. 2 includes a cooler blower 208. Cooler blower 208 receives atmospheric air, or ambient air from the outdoors, and provides an atmospheric air stream 210 to the air loop 200. The atmospheric air initially has a temperature equivalent to the outdoor temperature, which can range between winter temperatures of down to about −10° F. (−23° C.) or below and summer temperatures of up to about 100° F. (38° C.) or above, depending upon the location of the facility in which the CCR process is being used.

Atmospheric air stream 210 is divided into a plurality of air streams, including a first air stream 212 and a second air stream 214. One or more valves, such as, for example, illustrated valve 216, may be used to divide the atmospheric air stream 210. Valve 216 may also be used to control and regulate the amount and flow rate of the second air stream 214. First air stream 212 is provided to the regeneration cooler 202. When the regeneration cooler 202 is a tube in shell type heat exchanger, the first air stream 212 can be passed through the shell of the heat exchanger to act as a cooling stream for the first effluent stream 204. As first air stream 212 passes through the regeneration cooler 202, it absorbs heat from the first the first effluent stream 204, and it exits the regeneration cooler 202 as heated first air stream 218. A portion of heated first air stream 218 is separated and directed back into the CCR system as hot air stream 220. One or more valves, such as, for example, illustrated valve 222, may be used to separate and direct hot air stream 220. Any remaining portion of heated first air stream 218 may be vented to the atmosphere.

As illustrated in FIG. 2, hot air stream 220, or at least a portion thereof, can be combined with second air stream 214 from the cooling blower 208 to form a blended cooling air stream 224. In this manner, the heat of combustion of the spent catalyst that is removed from the first effluent stream 204 in the regeneration cooler 202 can be utilized as a heat source to adjust the temperature of the blended cooling air stream 224. The amount and flow rate of the hot air stream 220 may be controlled and regulated by passing the hot air stream 220 through one or more valves. In the example illustrated in FIG. 2, the hot air stream may be passed through a valve 228. Hot air stream 220 and second air stream 214 can be combined or blended in any suitable ratio with respect to their amounts, volumes, or flow rates in order to obtain a blended cooling air stream 224 having a desired temperature, volume or flow rate. For example, blended cooling air stream 224 can have a temperature of about 40° F. (4° C.) or greater. Blended cooling air stream 224 preferably has a temperature of from about 40° F. (4° C.) to about 160° F. (71° C.), more preferably about 120° F. (49° C.).

Blended cooling air stream 224 is passed through a conduit to cooling zone cooler 232. Cooling zone cooler 232 is a heat exchanger, and is preferably an indirect heat exchanger such as, for example, a tube in shell type heat exchanger. Blended cooling air stream 224 can be passed through the shell of the cooling zone cooler 232 to act as a cooling stream for a cooling loop stream 234 to form a catalyst cooling stream 236.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of providing a blended cooling air stream to a cooling zone cooler in a continuous catalyst regeneration system, the method comprising the steps of:
    removing a first effluent stream from a regeneration tower of the continuous catalyst regeneration system;
    providing the first effluent stream to a regeneration cooler;
    providing a first air stream to the regeneration cooler to form a heated first air stream wherein the regeneration cooler is an indirect heat exchanger;
    combining at least a portion of the heated first air stream with a second air stream to form a blended cooling air stream; and,
    providing the blended cooling air stream to the cooling zone cooler of the continuous catalyst regeneration system, wherein the cooling zone cooler of the continuous catalyst regeneration system is an indirect heat exchanger.

2. The method of claim 1, wherein the first effluent stream comprises nitrogen, oxygen and combustion products.

3. The method of claim 1, wherein the regeneration cooler is a tube-in-shell indirect heat exchanger.

4. The method of claim 3, wherein the first air stream is passed through the shell of the tube-in-shell indirect heat exchanger.

5. The method of claim 1, wherein the blended cooling air stream has a temperature of 40° F. (4° C.) or greater.

6. The method of claim 5, wherein the blended cooling air stream has a temperature of from 40° F. (4° C.) to 160° F. (71° C.).

7. The method of claim 1, wherein the cooling zone cooler is a tube-in-shell indirect heat exchanger.

8. The method of claim 7, wherein the blended cooling air stream is provided to the shell of the tube-in-shell indirect heat exchanger.

9. The method of claim 1, further comprising:
    removing a first gas stream from a regeneration tower of the continuous catalyst regeneration system;
    passing the first gas stream to an air heater to form a heated first gas stream;
    dividing the heated first gas stream to form a regeneration tower return stream and a cooling loop stream;
    providing the cooling loop stream to the cooling zone cooler of the continuous catalyst regeneration system; and
    cooling the cooling loop stream with the blended cooling air stream.

10. The method of claim 9, wherein the cooling zone cooler is a tube-in-shell indirect heat exchanger.

11. The method of claim 9, wherein the blended cooling air stream is provided to the cold side of the tube-in-shell indirect heat exchanger, and the cooling loop stream is provided to the hot side of the tube-in-shell indirect heat exchanger.

* * * * *